United States Patent [19]
Christian

[11] 4,118,636
[45] Oct. 3, 1978

[54] THERMAL AIR POWERED ELECTRIC GENERATOR SYSTEM

[76] Inventor: Merlin B. Christian, 1000 Northwood Dr. Apt. 142, Baytown, Tex. 77521

[21] Appl. No.: 745,129

[22] Filed: Nov. 26, 1976

[51] Int. Cl.$^2$ .............................................. H02K 7/18
[52] U.S. Cl. ..................... 290/52; 290/54; 60/641; 60/669
[58] Field of Search ................ 60/641, 650, 682, 669, 60/690; 126/270, 271; 290/1, 52, 54, 55

[56] References Cited

U.S. PATENT DOCUMENTS

| | | | |
|---|---|---|---|
| 401,516 | 4/1889 | Robb | 60/641 X |
| 1,485,186 | 2/1924 | Harza | 290/52 X |
| 3,137,125 | 6/1964 | Kyryluk | 126/270 X |
| 3,740,565 | 6/1973 | Wesley | 290/55 |
| 3,936,652 | 2/1976 | Levine | 60/682 X |
| 3,979,597 | 9/1976 | Drucker | 60/641 X |
| 4,016,725 | 4/1977 | Fiss | 60/690 |
| 4,018,051 | 4/1977 | Gay | 290/55 X |

*Primary Examiner*—Allen M. Ostrager
*Assistant Examiner*—Stephen F. Husar
*Attorney, Agent, or Firm*—N. Elton Dry

[57] ABSTRACT

In combination, a generally conical structure for collecting air and providing a confined space for solar heating of such air, connected, at the upper end of the conical structure, with a vertically placed electric generator through which the solar-heated air passes. The combination utilizes the principle that the heated air expands and becomes lighter, causing it to be displaced by the cooler, atmospheric air at the bottom of the air collecting structure, creating an upward flow of the heated air through the electric generator. The generator is unique for the purpose in that the generator rotor and turbine turn in concert and are a single unit.

7 Claims, 4 Drawing Figures

THERMAL AIR POWERED ELECTRIC GENERATOR SYSTEM

BACKGROUND OF THE INVENTION

1. The invention relates to a new and useful thermal air powered generator, and more particularly to the combination of a thermal air collecting and transporting means connected with the generator.

2. DESCRIPTION OF THE PRIOR ART

With the increasing cost and decreasing availability of conventional fossil fuels there is an ever intensifying search for alternate means of generating electricity. Nuclear fuels have been slow in reaching their full potential due to environmental and safety objectives. Hydroelectric installations are limited by environmental, terrain and other constraints that have virtually halted development in this area.

Steam and water, provided by the above sources, has long been the principle means of power generation. However, other sources are available for this purpose. Air is particularly compatible with environmental concerns of today. The prime factors to be considered in its efficient use are: heating means, transport and confinement, suitable introduction to electric generating means, and development of an electric generator most capable of producing commercial quantities of electricity.

Others have invented and patented various means of using either cooled or heated air in the production of power. Illustrative of these efforts are U.S. Pat. Nos. 3,894,393; 3,436,908; and 3,514,942. There are other patents which attempt to utilize the wind, such as U.S. Pat. No. 3,339,078, and others that have developed solar motors for various purposes, such as pumping water — U.S. Pat. No. 3,137,125.

U.S. Pat. No. 3,894,393 describes and claims a means for the generation of power from a cooled, falling air mass through a conduit which is connected to an air turbine and generator. The "air turbine" is in fact a "windmill," which in turn mechanically turns a power generator.

A similar means of power generation is taught in U.S. Pat. No. 3,436,908, as illustrated in FIGS. 1, 4 and 5. The connection between the moving air mass and the actual power generator being a mere "windmill". The main object in these inventions is how to concentrate and transport a sufficient amount of air to drive the "windmill". The U.S. Pat. No. 3,436,908 patent illustrates the concept of using the sun to heat air in a conduit, which is well illustrated in FIG. 1. The inventor teaches the additional feature of using black pipe to absorb heat more efficiently.

The invention illustrated in U.S. Pat. No. 3,514,942 is a variation on the above described invention in that solar energy is transferred into mechanical energy by means of heating air so that it passes through an "outlet turbine" which turns a shaft (mechanical energy). The invention can magnify the result by the use of a "compression" causing "inlet" generator on the air-inlet end of the heat transducer. No electricity is produced by the so-called generator. Apparently, the mechanical advantage is relatively small in comparison to that needed to generate electricity by a moving air mass.

DESCRIPTION OF THE PREFERRED EMBODIMENTS

Figure 1:
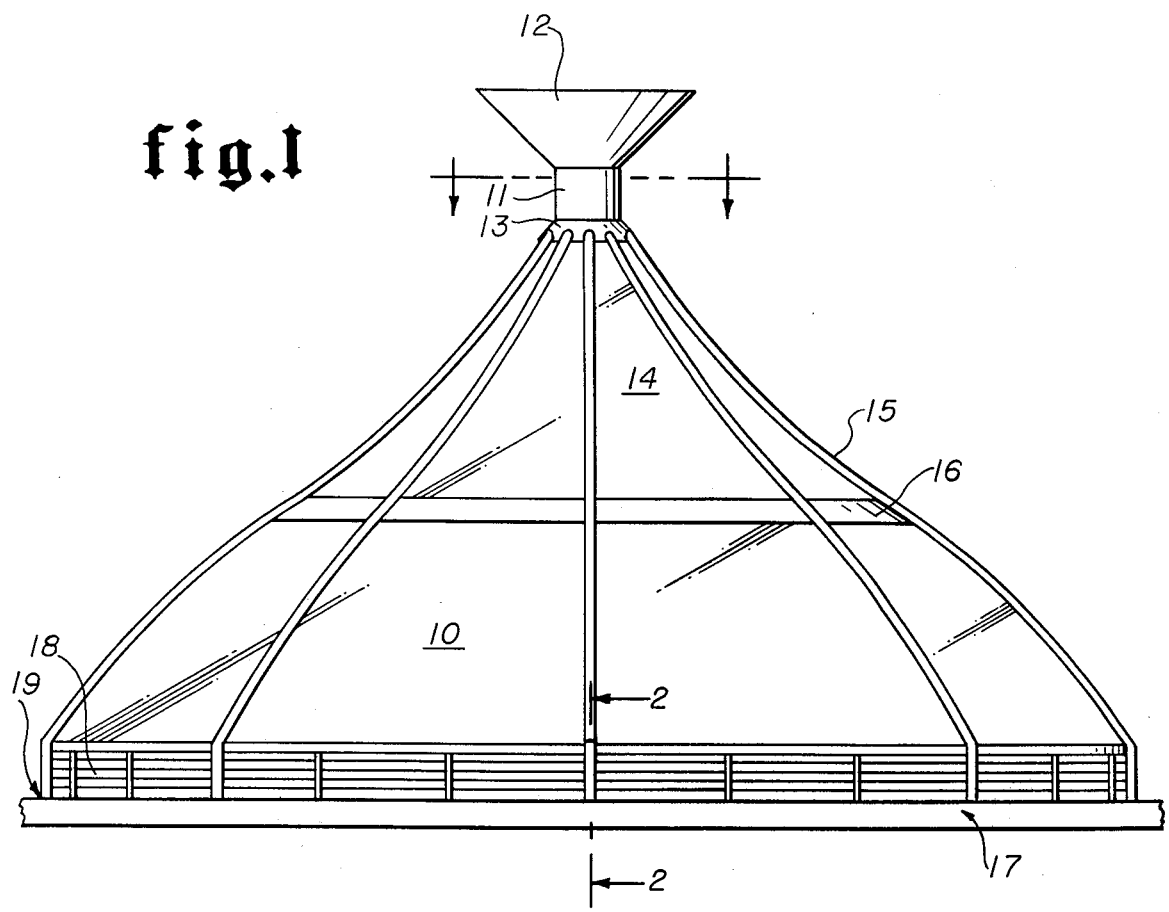
Figure 2:
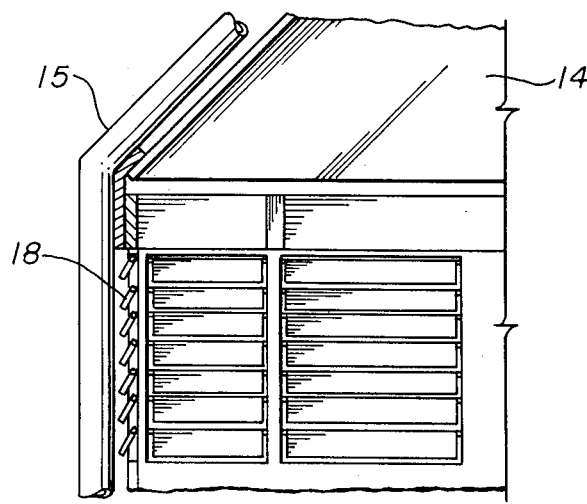
Figure 3:
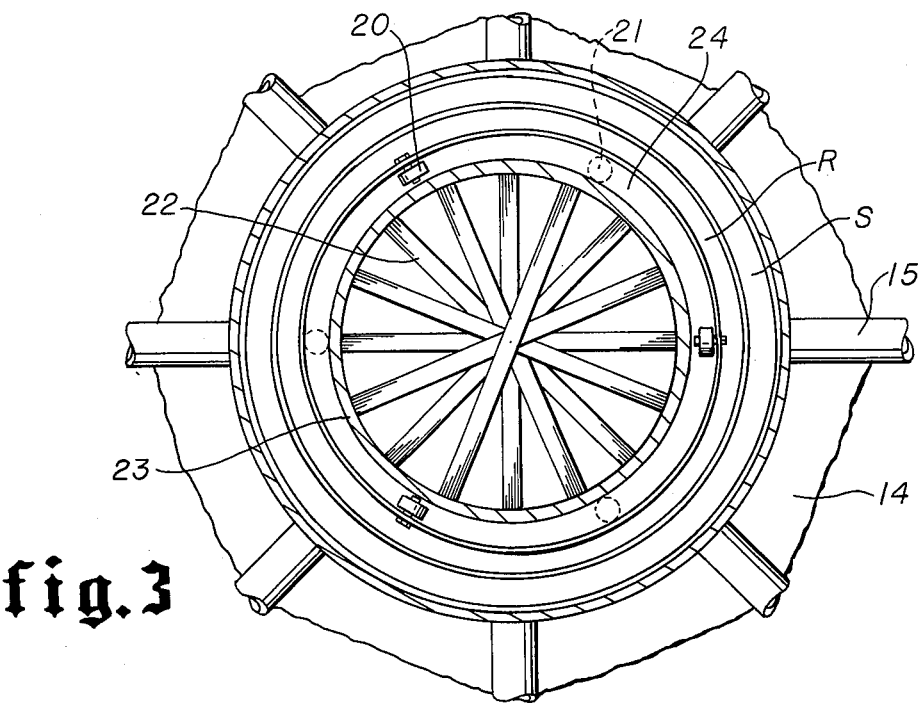
Figure 4:
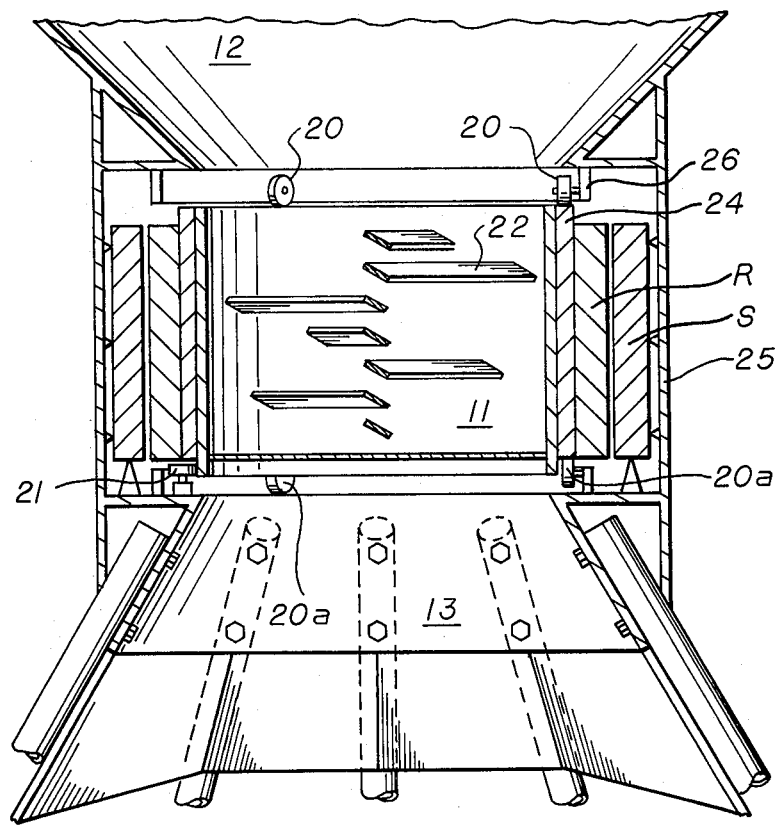

The invention will be more readily understood from a reading of the following specification and by reference to the accompanying drawings wherein an example of the invention is shown, and wherein:

FIG. 1 is a schematic showing of the thermal air powered electric generator system of the present invention, FIG. 2 is a cross sectional view along the line 2—2 of FIG. 1 showing variable air inlet vanes of the invention, FIG. 3 is a cross sectional view along the line 3—3 of FIG. 1 showing the turbine blade arrangement within the electrical generator, FIG. 4 is a cross sectional view of the electrical generator showing the relationship of its parts.

In the drawings, the numeral 10 designates the generally conically shaped means for collecting and heating air that is forced up through the generator 11. The air exits through the generator 11 and shroud 12. Electricity is generated by this movement of air through the collector 10 up through the generator 11, as schematically illustrated in FIG. 1. The rate of entry of air into the collector is controlled by means of the vanes 18, more clearly shown in FIG. 2.

The generation of electricity by the present invention is by way of the turbine-generator combination which is illustrated in FIGS. 3 and 4. Generally, the heated, rising air mass passes through the upper neck 13 of the collector 10, and thence through the turbine-generator 11, exiting through the shroud 12. The generator rotor R is an integral part of the turbine 24, being attached to and surrounding the outerside of the turbine. The stator S is fixed and attached to the inner surfaces of the outer wall 25 of overall turbine-generator housing. The stator S surrounds the rotor R as illustrated in FIGS. 3 and 4.

The blades 22 of the turbine extend across the inside diameter of the turbine and are "stacked" an equidistance apart from the bottom to the top of the turbine. As viewed from the top downwardly into the turbine, in FIG. 3, it is seen that the turbine blades are arranged sequentially at a 45° angle to the preceding blade. Such arrangement, however, is not critical to the present invention, being merely an example of the turbine useful in the present invention.

The critical feature of the turbine and generator is the unitary construction which provides a single unit having no shaft. The rotor R is attached to the outer turbine wall 24 and is surrounded by the stator S attached to the inner surface of the outer wall 25 of the overall turbine-generator housing. The generator rotor R and turbine 11 thus turn as a single unit. There is a bearing race 24 between the rotor R and turbine 11 which forms the outer wall of the turbine.

It is preferred that three bearings, represented by numerals 20a, spaced equally 120° apart, support the turbine-rotor combination via the support ring 24. Directly above each of the three support bearings 20a, on the upper edge of support ring 24 are mounted a thrust or restraining bearing 20. Three individual restraining bearing mounts 26 hold the restraining bearings 20 in place.

Depending upon service of the turbine-generator, it may be useful to employ a greater number of support bearings 20a and/or restraining bearings 20. In a system of this type reduction of friction would be essential. Consequently, it is recommended that the three bearings in each configuration, as shown in the drawing, would be optimum.

Lateral movement of the turbine 11 is restrained by the bearings 21 displaced at a 90° angle to the turbine 11 and located beneath the support ring 24 and contacting the lower outer edge of the turbine wall 23.

The turbine-generator 11 is mounted at the top of an air collector 10, as shown in FIG. 1. Air enters the collector 10 at the lower end thereof through vanes 18. The vanes 18 are adjustable so as to allow more or less air to enter the collector 10. The actual arrangement of vanes 18 is optional and the arrangement shown in FIGS. 1 and 2 are merely illustrative.

The entire collector structure is supported by a series of support members 15 which are anchored into a concrete base 17. The vanes 18 may be attached to the inner or outer sides of the support members 15. In FIGS. 1 and 2 the vanes 18 are shown to be displaced on the inside surface of the support members 15, and form the lower portion of collector 10.

The support members 15 extend upwardly from the base 19 and are attached at their upper end to the upper neck 13 of the collector 10. Their upper terminal arrangement is illustrated best in FIG. 4. The support members 15 are preferably constructed from structural steel of sufficient strength to support the entire structure.

The collector 10 is attached to the support members by means of one or more lateral support rings 16 which are either on the inner or outer surface of a collector covering 14. The collector covering 14 covers and defines the area of air within the air collector 10. This covering is constructed from a translucent or transparent material in order to allow maximum heating of the entire area under the covering 14. The covering 14 extends upwardly from the upper edge of the vanes 18 to the neck 13.

The overall dimensions of the collector 10 are dependent on AC current to be generated. However, it has been discovered that the most useful rule to follow in sizing the collector is to provide for a 2 to 1 width to height ratio. Thus, if the width were to be 300 feet, across the base, the height from base 19 to neck 13 should preferably be 150 feet.

Of course, there can be material variation in this ratio and still produce electricity, but the 2 to 1 ratio appears to be optimum. There are many factors involved in this ratio which would dictate a variation, not the least of which would be the choice of covering 14 material and outside heating source.

It is anticipated that in many locations sunlight would provide sufficient heat to cause the air mass under cover to rise in sufficient quantities to generate electricity. However, other heating sources are possible. Specific heating sources are not essential to the present invention, other than such source would be external to the collector 10.

Methods and materials of construction of the entire structure are conventional and known to the building arts. They are dependent only on loads and service. What is unique is the combination of elements, particularly with regard to the shaftless AC generator.

The foregoing description of the invention is explanatory thereof and various changes in the size, shape and materials, as well as in the details of the illustrated construction may be made without departing from the spirit of the invention.

I claim:

1. A thermal air powered alternating current electric generator system comprising, in combination,
    (a) a generally conical structure for collecting air having an upper and lower end, said structure having a covering through which a maximum amount of radiant heat may pass from the exterior to the interior thereof,
    (b) means at the lower end of said structure for the passage of air from the outside of said structure to the inside thereof,
    (c) mounted on the upper end of said structure, an alternating current (Ac) producing turbine-generator whose main axis extends vertically from said structure and which comprises a shaftless turbine forming the center portion of the generator and having attached circumferentially thereto a rotor, which when powered, rotates as an integral part of the turbine to which it is attached, and a stator surrounding the rotor and attached at the inner wall of a housing which surrounds and encloses the entire turbine-generator, the turbine-generator having means at either end thereof for ingress and egress of air which passes upwardly through the collector, thence through the turbine-generator to produce an alternating current.
    (d) said turbine further having a plurality of blades, the blades being sequentially stacked from top to bottom of the turbine, each blade being arranged across the diameter of the turbine and being at essentially a 45° angle from the preceding blade.

2. The electric generator system of claim 1 whrein the air collecting structure has a width to height ratio of about 2 to 1 and the covering thereof is translucent.

3. The electric generator system of claim 1 wherein the air collecting structure has a width to height ratio of about 2 to 1 and the covering thereof is transparent.

4. The electric generator system of claim 1 wherein the air collecting structure has means at the bottom portion thereof for admitting a variable flow of air from the outside to the inside thereof.

5. The electric generator system of claim 1 wherein the turbine/rotor combination rests on a plurality of bearings upon which said turbine/rotor combination turns when powered by air passing from the collector through the turbine.

6. The electric generator system of claim 5 wherein there are at least three bearings spread equally 120° apart and wherein there is a thrust bearing mounted at the upper end of the turbine/rotor combination, directly above each of the support bearings.

7. The electric generator system of claim 1 wherein there is mounted on the air exiting end of the turbine-generator means for directing the flow of air exiting said turbine-generator.

* * * * *